United States Patent [19]

Nguyen et al.

[11] Patent Number: 5,501,274
[45] Date of Patent: Mar. 26, 1996

[54] CONTROL OF PARTICULATE FLOWBACK IN SUBTERRANEAN WELLS

[75] Inventors: Philip D. Nguyen; Jim D. Weaver, both of Duncan; David L. Brown, Temple, all of Okla.

[73] Assignee: Halliburton Company, Duncan, Okla.

[21] Appl. No.: 412,668

[22] Filed: Mar. 29, 1995

[51] Int. Cl.$^6$ .......................... E21B 43/04; E21B 43/267
[52] U.S. Cl. .......................... 166/276; 166/280; 166/281; 166/295
[58] Field of Search .................................. 166/276, 280, 166/281, 288, 295

[56] References Cited

U.S. PATENT DOCUMENTS

| | | | |
|---|---|---|---|
| 2,187,895 | 1/1940 | Sanders | 166/276 |
| 3,149,673 | 9/1964 | Pennington | 166/280 |
| 3,363,690 | 1/1968 | Fischer | 166/280 |
| 3,659,651 | 5/1972 | Graham | 166/280 |
| 3,973,627 | 8/1976 | Hardy et al. | 166/276 |
| 4,494,605 | 1/1985 | Wiechel et al. | 166/288 |
| 5,330,005 | 7/1994 | Card et al. | 166/280 |

*Primary Examiner*—George A. Suchfield
*Attorney, Agent, or Firm*—Robert A. Kent

[57] ABSTRACT

The addition of a thermoplastic material in intimate mixture with particulates for fracturing, gravel packing or other formation treatments decreases or substantially eliminates the flowback of particulates whether proppants or formation fines while stabilizing the particulate within the formation. Preferred thermoplastic materials include polyolefins, polyamides, polyvinyls and cellulose derivatives in the form of particles, ribbons or flakes.

20 Claims, No Drawings

CONTROL OF PARTICULATE FLOWBACK IN SUBTERRANEAN WELLS

BACKGROUND OF THE INVENTION

1. Field of the Invention

This invention relates to means for recovering hydrocarbons from a subterranean formation and more particularly to a method and means for controlling particulate solids transport during the production of hydrocarbons from a subterranean formation.

2. Brief Description of the Prior Art

Transport of particulate solids during the production of hydrocarbons from a subterranean formation is a continuing problem. The transported solids can erode or cause significant wear in the hydrocarbon production equipment used in the recovery process. The solids also can clog or plug the wellbore thereby limiting or completely stopping fluid production. Further, the transported particulates must be separated from the recovered hydrocarbons adding further expense to the processing.

The particulates which are available for transport may be present due to an unconsolidated nature of a subterranean formation and/or as a result of well treatments placing particulates in a wellbore or formation, such as, by gravel packing or propped fracturing.

In the treatment of subterranean formations, it is common to place particulate materials as a filter medium and/or a proppant in the near wellbore area and in fractures extending outwardly from the wellbore. In fracturing operations, proppant is carried into fractures created when hydraulic pressure is applied to these subterranean rock formations to a point where fractures are developed. Proppant suspended in a viscosified fracturing fluid is carried outwardly away from the wellbore within the fractures as they are created and extended with continued pumping. Upon release of pumping pressure, the proppant materials remain in the fractures holding the separated rock faces in an open position forming a channel for flow of formation fluids back to the wellbore.

Proppant flowback is the transport of proppant sand back into the wellbore with the production of formation fluids following fracturing. This undesirable result causes undue wear on production equipment, the need for separation of solids from the produced hydrocarbons and occasionally also decreases the efficiency of the fracturing operation since the proppant does not remain within the fracture and may limit the width or conductivity of the created flow channel.

Currently, the primary means for addressing the proppant flowback problem is to employ resin-coated proppants, resin consolidation of the proppant or forced closure techniques. The cost of resin-coated proppant is high, and is therefore used only as a tail-in in the last five to twenty five percent of the proppant sand placement. Resin-coated proppant is not always effective since there is some difficulty in placing it uniformly within the fractures and, additionally, the resin coating can have a deleterious effect on fracture conductivity. Resin coated proppant also may interact chemically with common fracturing fluid crosslinking systems such as guar or hydroxypropylguar with organo-metallics or borate crosslinkers. This interaction results in altered crosslinking and/or break times for the fluids thereby affecting placement. Another means showing reasonable effectiveness has been to gradually release fracturing pressure once the fracturing operation has been completed so that fracture closure pressure acting against the proppant builds slowly allowing the proppant particles to stabilize before flowback of the fracturing fluid and the beginning of hydrocarbon production. Such slow return is undesirable, however, since it reduces the production from the wellbore until the treatment fluid is removed.

In unconsolidated formations, it is common to place a filtration bed of gravel in the near-wellbore area in order to present a physical barrier to the transport of unconsolidated formation fines with the production of hydrocarbons. Typically, such so-called "gravel packing operations" involve the pumping and placement of a quantity of gravel and/or sand having a mesh size between about 10 and 60 mesh on the U.S. Standard Sieve Series into the unconsolidated formation adjacent to the wellbore. It is sometimes also desirable to bind the gravel particles together in order to form a porous matrix through which formation fluids can pass while straining out and retaining the bulk of the unconsolidated sand and/or fines transported to the near wellbore area by the formation fluids. The gravel particles may constitute a resin-coated gravel which is either pre-cured or can be cured by an overflush of a chemical binding agent once the gravel is in place. It has also been know to add various binding agents or adhesives directly to an overflush of unconsolidated gravel in order to bind the particles together.

U.S. Pat. No. 5,330,005 discloses a method for overcoming the difficulties of resin coating proppants or gravel packs by the incorporation of a fibrous material in the fluid with which the particulates are introduced into the subterranean formation. The fibers generally have a length ranging upwardly from about 2 millimeters and a diameter of from about 6 to about 200 microns. Fibrillated fibers of smaller diameter also may be used. The fibers are believed to act to bridge across constrictions and orifices in the proppant pack and form a mat or framework which holds the particulates in place thereby limiting particulate flowback.

While this technique may function to limit some flowback, it fails to secure the particulates to one another in the manner achieved by use of resin coated particulates. It would be desirable to provide a method which will physically bind particles of the particulate to one another whereby agglomerates may be formed which would further assist in preventing movement or flowback of particulates from a wellbore or formation.

SUMMARY OF THE INVENTION

The present invention provides a method and fluid for treating a subterranean formation and a resultant porous particulate pack which inhibits the flow of particulates back through the wellbore with the production of hydrocarbons.

In accordance with the invention, a method of treating a subterranean formation penetrated by a wellbore is provided comprising the steps of providing a fluid suspension including a mixture of particulate material and a thermoplastic material in particulate, ribbon or flake form, pumping the fluid suspension including the mixture of particulate and thermoplastic material through the wellbore and depositing the mixture in the formation. Upon deposition of the particulate and thermoplastic material mixture in the formation the thermoplastic material begins to soften as it is heated by the subterranean formation. As the thermoplastic material softens it becomes very tacky and causes particulate adjacent the material to adhere to the thermoplastic thereby creating agglomerates which bridge against other agglomerates in the formation to prevent particulate flowback. When the thermoplastic material comprises flakes or ribbons of a material that has been subjected to a uniaxial or biaxial stress during preparation, the material in addition to softening, shrinks and twists thereby wrapping itself about individual particulate particles and further locking them in place within the agglomerates. The thermoplastic material may comprise ground material having an average particle size of from about 10 to 150 mesh on the U.S. Sieve Series. When in ribbon form it may be from 2.5 to 250 microns thick, 0.4 millimeters to about 6.5 millimeters wide and have a length of from about 5 millimeters to in excess of 50 millimeters. When in flake form, the thermoplastic material may have a thickness of from about 2.5 to about 250 microns and an average surface area of from about 2 to about 325 sq millimeters.

The thermoplastic material is effective in inhibiting the flowback of particulate in a porous pack having a size ranging from about 2 to about 400 mesh in intimate admixture with the thermoplastic material.

The thermoplastic material is effective in consolidating particulate in the form of agglomerates in a formation as a result of a fracturing or gravel packing treatment performed on a subterranean formation without the use of complicated and expensive resin consolidating formulations or precoated particulates.

DETAILED DESCRIPTION OF THE PREFERRED EMBODIMENTS

In accordance with the present invention, a thermoplastic material is incorporated in an intimate mixture with a particulate material such as conventional proppants or gravel packing materials and introduced into a subterranean formation.

As used in this specification, the term "intimate mixture" will be understood to mean a substantially uniform dispersion of the components in the mixture. The term "simultaneous mixture" will be understood to mean a mixture of components that are blended together in the initial steps of the subterranean formation treatment process or the preparation for the performance of the treatment process.

The thermoplastic material may comprise any thermoplastic material capable of softening upon heating or softening at the temperature of the subterranean formation whereby it may adhere to the particulates with which it is introduced. Examples of suitable materials include polyolefins including polyethylene, polypropylene, polybutylene polymers and fluoropolymers and copolymers, polyimides, polyurethanes, polysulfones, polycarbonates and cellulose derivatives.

The thermoplastic material may be utilized in substantially any physical form, such as for example, ground material, ribbons, flakes and the like.

The thermoplastic material may comprise ground material having an average particle size of from about 10 to about 150 mesh on the U.S. Sieve Series. When the material is in the form of a ribbon, it may be from about 2.5 to about 250 microns thick, from about 0.4 to about 6.5 millimeters wide and from about 5 to in excess of from about 50 millimeters in length. When in flake form the thermoplastic material may have a thickness of from about 2.5 to about 250 microns and may have either a regular of irregular shape and will have a surface area in the range of from about 2 to about 325 square millimeters. The quantity of thermoplastic material used in the intimate mixture can range from about 0.01% to about 15 percent by weight of the particulate. Preferably, the thermoplastic material concentration ranges from about 0.1 to about 5 percent by weight of the particulate.

The thermoplastic material interacts mechanically with the particles of particulate introduced into the subterranean formation to limit or prevent the flowback of particulates to the wellbore. The thermoplastic material is dispersed within the particulates such that it provides mechanical resistance to flow by increasing the contact area of individual particles such that they interact to interlock together within the formation instead of having a single grain to grain contact point which has little resistance to movement.

An important additional feature of the thermoplastic material is the chemical interaction that occurs upon heating various thermoplastic materials within the formation. The thermoplastic material is unstable upon introduction into the subterranean formation with the particulate and upon heating interacts within the formation to adhesively bind particles of the particulate into larger adhered agglomerates which are locked into place through bridging with the other particulates and agglomerates to prevent flowback of particulates to the wellbore.

The thermoplastic material may be incorporated with the particulate in any of the conventional fracturing or gravel packing fluids comprised of an aqueous fluid, a hydrocarbon fluid or an emulsion, a viscosifying agent and any of the various known breakers, buffers, surfactants, clay stabilizers or the like.

The thermoplastic material is incorporated with the particulate as a simultaneous mixture by introduction into the fracturing or gravel packing fluid along with the particulate. The material may be introduced into the fluid before, after or simultaneously with introduction of the particulate into the fluid. The thermoplastic material may be pre-blended as a mixture of dry discrete components prior to introduction into the fluid. The thermoplastic material may be incorporated with the entire quantity of particulate introduced into the subterranean formation or it may be introduced with only a portion of the particulate, such as in the final stages of the treatment to place the intimate mixture in the formation in the vicinity of the wellbore. For example, the thermoplastic material may be added to only the final 20 to 30 percent of the fluid introduced into the formation. In this instance, the intimate mixture will form a tail-in to the treatment which upon interaction within the formation with the particulate will cause the other particles to bridge on the agglomerates formed therein and prevent movement of the particles into the wellbore with any produced fluids.

The thermoplastic material upon introduction into the formation is heated to a temperature above the temperature at which the material is admixed as a simultaneous mixture. The thermoplastic material softens as it is heated and generally becomes tacky or adhesive whereupon it adheres to or binds particles of the particulate in which it is in contact within the formation. When the thermoplastic material has been subjected to either uniaxial or biaxial stress prior to addition to the particulate, the thermoplastic material exhibits the additional property of shrinking and twisting further binding the material to the particulate. The thermoplastic material may be subjected to biaxial stress through the formation of a film of the material. The film may be cut into ribbons or shredded into flakes. In one embodiment, the thermoplastic material may be comprised of multiple layers of different thermoplastic materials to vary the properties of the material. The layered material then may be cut or shredded as desired. Thus, a more tacky material can be combined with a material that will readily shrink or distort upon heating to improve the agglomeration properties.

To further illustrate the present invention and not by way of limitation, the following examples are provided.

EXAMPLE I

The stabilization properties of the method of the present invention are determined by comparison to a viscosified fluid containing particulate in a flow cell. Proppant conductivity and critical proppant flowback velocity is measured in an American Petroleum Institute approved simulated fracture flow cell. The cell has a proppant bed size of about 1.5 inches in height, about 7 inches in length and about 0.25 inches in width. The bed is initially prepacked with 20–40 mesh Brady Sand by introducing the sand into the cell in a borate crosslinked guar fluid containing 30 pounds of guar per 1000 gallons of aqueous fluid. The fluid also included a quantity of an oxidizing breaker with a low temperature catalyst to break the gel. The cell was maintained at room temperature (approximately 78° F.) for approximately 16–18 hours and the fracture conductivity was determined at a simulated closure stress of 2000 psi using a 2% KCl solution. Once conductivity was established, the screen in the end of the flow cell was removed and the cell was fitted with a full open slot about 1.5 inches high and 0.25 inches wide visible through a sight glass. Fluid flow of a 2% KCl solution then was initiated at steadily increasing flow rates through the proppant bed until proppant production was noted to occur through the slot. The cell then is cleaned and packed with another proppant material for testing. The test was repeated using a proppant containing 1 percent by weight of glass fibers having a 12 micron diameter and ½ inch length and a proppant containing 0.5% by weight of a thermoplastic material comprising polyethylene film in ribbons 0.25 inch long, 0.18 inch wide and 0.002 inch thick.

Sand production occurred in the test of proppant alone at a flow rate of 150 cc per minute. No sand production was found to occur in the test using glass fibers or polyethylene ribbons at a flow rate of 500 cc per minute which was the maximum pump rate achievable by the test equipment.

The effluent from the test cell was recovered after each test and examined for particulate and other materials. The test utilizing glass fibers was found to contain numerous small particles of glass fiber in the effluent. The broken fibers comprised about 1 percent of the total fibers used in the test. The test utilizing thermoplastic material was found to contain no thermoplastic material in the effluent.

EXAMPLE II

A series of tests were performed to determine the unconfined sand flow resulting from passage of a fluid through a simulated perforation in a packed unconsolidated bed. A cylindrical test cell 1 inch in diameter and 6 inches long having a ½ inch diameter hole in one end was arranged in a vertical orientation with a screen in the bottom open end of the cylinder. The cell was filled with a proppant pack to be tested as a water wet slurry. Water then was pumped from the bottom of the cylinder through the bed and out the ½ inch opening. The flow rate of water through the cell was gradually increased until continuous sand production was found to occur through the ½ inch diameter opening. The first test utilized 20–40 mesh Brady Sand. The second test utilized 20–40 mesh Brady Sand including 1% by weight polyethylene ribbons 12 millimeters long, 3 millimeters wide and 50 microns thick.

Sand production occurred from the first flow test at a continuous rate at a flow rate of 160 ml/min. No sand production occurred in the second test including the polyethylene ribbons at a flow rate of 2800 ml/min., which was the maximum rate of the test pumping equipment.

EXAMPLE III

The fracture flow capacity for thermoplastic material in flake form was determined by placing varying concentrations of the thermoplastic material flakes of the present invention comprising a shredded polyethylene film into the test cell described in Example I in admixture with 20–40 Brady Sand. The cell was dry packed with the proppant/thermoplastic mixture at a concentration of about 2 pound per square foot of simulated fracture surface area. Water was flowed through the cell at the temperatures indicated in the table below until conductivity stabilized in each test. The temperature then was increased to the next higher temperature level and the conductivity determined. The results are set forth in the Table below.

TABLE

| Test No. | Thermoplastic Material Concentration, Wt. % | Conductivity at Temp. md - ft | | |
|---|---|---|---|---|
| | | 78° | 250° | 350° |
| 1 | 2 | 5680 | 3130 | 2190 |
| 2 | 1 | 6330 | 4590 | 2870 |
| 3 | 0.5 | 5590 | 4440 | 3540 |
| 4 | 0.25 | 5980 | 4730 | 3770 |

While the present invention has been described with regard to that which is currently considered to comprise the preferred embodiments of the invention, other embodiments have been suggested and still other embodiments will occur to those individuals skilled in the art upon receiving the foregoing specification. It is intended that all such embodiments shall be included within the scope of the present invention as defined by the claims appended hereto.

What is claimed is:

1. Method of treating a subterranean formation penetrated by a wellbore comprising the steps of providing a fluid suspension including a mixture of a particulate material and a thermoplastic material wherein said thermoplastic material is in the form of flakes having a thickness of from about 2.5 to about 250 microns and an average surface area of from about 2 to about 325 square millimeters; pumping the fluid suspension including the mixture into the subterranean formation through the wellbore; depositing the mixture of particulate and thermoplastic material in the subterranean formation whereby the material interacts with at least a portion of the particulate to retard movement within said formation of said particulate.

2. The method of claim 1 wherein the particulate is sand and the thermoplastic material comprises at least one member selected from the group of polyolefins, polyamides, polyvinyls, polyimides, polyurethanes, polysulfones, polycarbonates, polyesters and cellulose derivatives.

3. The method of claim 1 wherein the thermoplastic material is present in an amount of from about 0.01 to about 15 percent by weight of the particulate.

4. The method of claim 1 wherein the thermoplastic material is present in an amount of from about 0.1 to about 5 percent by weight of the particulate.

5. The method of claim 1 wherein the pumping is effected at a pressure in excess of the fracturing pressure for the subterranean formation such that at least one fracture is created in the subterranean formation.

6. The method of claim 1 wherein the pumping is effected at a pressure less than the fracturing pressure for the subterranean formation such that the mixture of particulate and thermoplastic material is deposited in a near-wellbore zone.

7. Method of treating a subterranean formation penetrated by a wellbore comprising the steps of providing a fluid suspension including a mixture of a particulate material and a thermoplastic material which interacts upon heating; pumping the fluid suspension including the mixture into the subterranean formation through the wellbore; depositing the mixture of particulate and thermoplastic material in the subterranean formation; and heating the thermoplastic material upon introduction into the subterranean formation whereby the material interacts with at least a portion of the particulate.

8. The method of claim 7 wherein the particulate is sand and the thermoplastic material comprises at least one member selected from the group of polyolefins, polyamides, polyvinyls, polyimides, polyurethanes, polysulfones, polycarbonates, polyesters and cellulose derivatives.

9. The method of claim 7 wherein the thermoplastic material is in the form of ribbons having a thickness of from about 2.5 to about 250 microns, a width of from about 0.4 to about 6.5 millimeters and a length of from about 5 to about 50 millimeters.

10. The method of claim 7 wherein the thermoplastic material is in the form of flakes having a thickness of from about 2.5 to about 250 microns and an average surface area of from about 2 to about 325 sq. millimeters.

11. The method of claim 7 wherein the thermoplastic material is present in an amount of from about 0.01 to about 15 percent by weight of the particulate.

12. The method of claim 7 wherein the thermoplastic material is present in an amount of from about 0.1 to about 5 percent by weight of the particulate.

13. The method of claim 7 wherein the pumping is effected at a pressure in excess of the fracturing pressure for the subterranean formation such that at least one fracture is created in the subterranean formation.

14. The method of claim 7 wherein the pumping is effected at a pressure less than the fracturing pressure for the subterranean formation such that the mixture of particulate and thermoplastic material is deposited in a near-wellbore zone.

15. The method of claim 7 wherein the thermoplastic material is in the form of a particulate having a particle size in the range of from about 10 to about 60 mesh.

16. A method of treating a subterranean formation penetrated by a wellbore comprising the steps of providing a fluid suspension including a mixture of a particulate material and a thermoplastic material wherein said thermoplastic material is in the form of ribbons having a thickness of from about 2.5 to about 250 microns, a width of from about 0.4 to about 6.5 millimeters and a length of from about 5 to about 50 millimeters; pumping the fluid suspension including the mixture into the subterranean formation through the wellbore; depositing the mixture of particulate and thermoplastic material in the subterranean formation whereby the material interacts with at least a portion of the particulate to retard movement within said formation of said particulate.

17. The method of claim 16 wherein the particulate is sand and the thermoplastic material comprises at least one member selected from the group of polyolefins, polyamides, polyvinyls, polyimides, polyurethanes, polysulfones, polycarbonates, polyesters and cellulose derivatives.

18. The method of claim 16 wherein the thermoplastic material is present in an amount of from about 0.01 to about 15 percent by weight of the particulate.

19. The method of claim 16 wherein the pumping is effected at a pressure in excess of the fracturing pressure for the subterranean formation such that at least one fracture is created in the subterranean formation.

20. The method of claim 16 wherein the pumping is effected at a pressure less than the fracturing pressure for the subterranean formation such that the mixture of particulate and thermoplastic material is deposited in a near-wellbore zone.

* * * * *